United States Patent [19]

Clausing

[11] 4,334,759
[45] Jun. 15, 1982

[54] PRECISE CENTER LINE REGISTRATION OF A SUBSTRATE

[75] Inventor: Don P. Clausing, Brighton, N.Y.

[73] Assignee: Xerox Corporation, Stamford, Conn.

[21] Appl. No.: 137,081

[22] Filed: Apr. 3, 1980

[51] Int. Cl.$^3$ .................. G03G 15/00; B65H 9/16; B65H 25/26

[52] U.S. Cl. .................. 355/3 SH; 355/14 SH; 271/228; 271/251; 226/21

[58] Field of Search .................. 355/3 SH, 14 SH; 271/227, 228, 248, 250, 251, 253, 254, 255; 226/15, 19, 20, 199

[56] References Cited

U.S. PATENT DOCUMENTS

| | | | |
|---|---|---|---|
| 1,951,901 | 3/1934 | Cottrell | 271/58 |
| 2,178,304 | 10/1939 | Holness | 271/58 |
| 2,666,639 | 1/1954 | Frommer | 271/2.6 |
| 2,782,030 | 2/1957 | Webster et al. | 271/2.6 |
| 2,842,361 | 7/1958 | Miller | 271/2.6 |
| 3,024,955 | 3/1962 | Powers, Jr. | 226/22 |
| 3,090,534 | 5/1963 | Frommer et al. | 226/21 |
| 3,325,072 | 6/1967 | Black et al. | 226/20 |
| 3,473,035 | 10/1969 | Gardner et al. | 355/14 SH X |
| 4,211,399 | 7/1980 | McGowan | 271/250 X |
| 4,245,836 | 1/1981 | Joosten | 271/228 |

FOREIGN PATENT DOCUMENTS

| | | | |
|---|---|---|---|
| 953946 | 4/1961 | United Kingdom | 271/227 |
| 1307664 | 2/1973 | United Kingdom . | |
| 1323868 | 7/1973 | United Kingdom . | |
| 1400217 | 7/1975 | United Kingdom | 271/227 |

OTHER PUBLICATIONS

IBM Disclosure Bulletin, vol. 18, No. 5, Oct. 1975, p. 1307, "Sheet Aligner", Harding et al.

Primary Examiner—J. V. Truhe
Assistant Examiner—Richard M. Moose
Attorney, Agent, or Firm—Bernard A. Chiama

[57] ABSTRACT

Apparatus for precise center registration of a sheet with respect to a fixed reference line such as the center line in a copier. To accomplish this, a sidewall and an associated sensor move in unison relative to the machine center line. With the sheet registered against the sidewall, the sidewall and the sensor which are maintained equidistant from the machine center line move until the sensor senses the edge of the sheet. The motion is then stopped by a signal from the sensor thereby providing precise center line registered sheets.

2 Claims, 3 Drawing Figures

PRECISE CENTER LINE REGISTRATION OF A SUBSTRATE

The present invention relates to a method and means for center registering substrates and more particularly to apparatus that registers substrates along the center line of a copier.

Various solutions to the problem of center line registration have been advanced in the past including the following: U.S. Pat. No. 3,325,072, issued June 13, 1967 to Black et al.; U.S. Pat. No. 3,024,955, issued Mar. 13, 1962 to R. W. Powers, Jr.; U.S. Pat. No. 2,842,361, issued July 8, 1958 to H. R. Miller; and U.S. Pat. No. 2,666,639, issued Jan. 19, 1954 to J. C. Frommer. All of these patents illustrate the broad concept of centering a sheet or web by means of opposite edge detectors mounted so as to maintain their respective distances from the center line equal during movement. Other patents disclosing techniques directed toward the broad centering concept include: U.S. Pat. No. 2,782,030, issued to Webster et al. on Feb. 19, 1957 and U.S. Pat. No. 3,090,534, issued to Frommer et al. on May 21, 1963. These patents propose moving edge detectors with independent motion, while Holness in U.S. Pat. no. 2,178,304, issued Oct. 31, 1939, suggests centering sheets with alignment marks on the sheets.

Although not illustrating the technique of center line registration of a sheet, U.S. Pat. No. 1,951,901, issued Mar. 20, 1934 to C. B. Cottrell, 3D; and British Pat. Nos. 953,946 and 1,307,664 show a method of sheet edge registration wherein a sheet is moved towards a detector on one of the edges. In British Pat. No. 1,323,868, an entire assembly, such as a printing cylinder or transfer cylinder, is moved in order to provide registration of a sheet.

It is in answer to the short comings of the above-mentioned devices, such as being expensive, cumbersome and space consuming, that the improvement of the present invention is provided. Accordingly, in an aspect of the invention, a precise center line registration system is presented that comprises means for registering a sheet against a fixed sidewall. The sidewall and a sensor opposite the sidewall are adapted for movement in unison so that they are always equidistant from a reference center line. With the sheet registered against the sidewall and in the process of registering with the sidewall tripping a switch that controls a drive motor, the sidewall and the sensor move until the sensor senses the edge of the sheet. The motion is then stopped by a signal from the sensor. The sheet is now precisely registered with the reference center line.

Further aspects, features and advantages of the invention pertain to the particular arrangement and structure whereby the abovementioned aspect of the invention is obtained. The invention will be better understood by reference to the following description and to the drawings forming a part thereof, which are substantially to scale, wherein.

Figure 1:
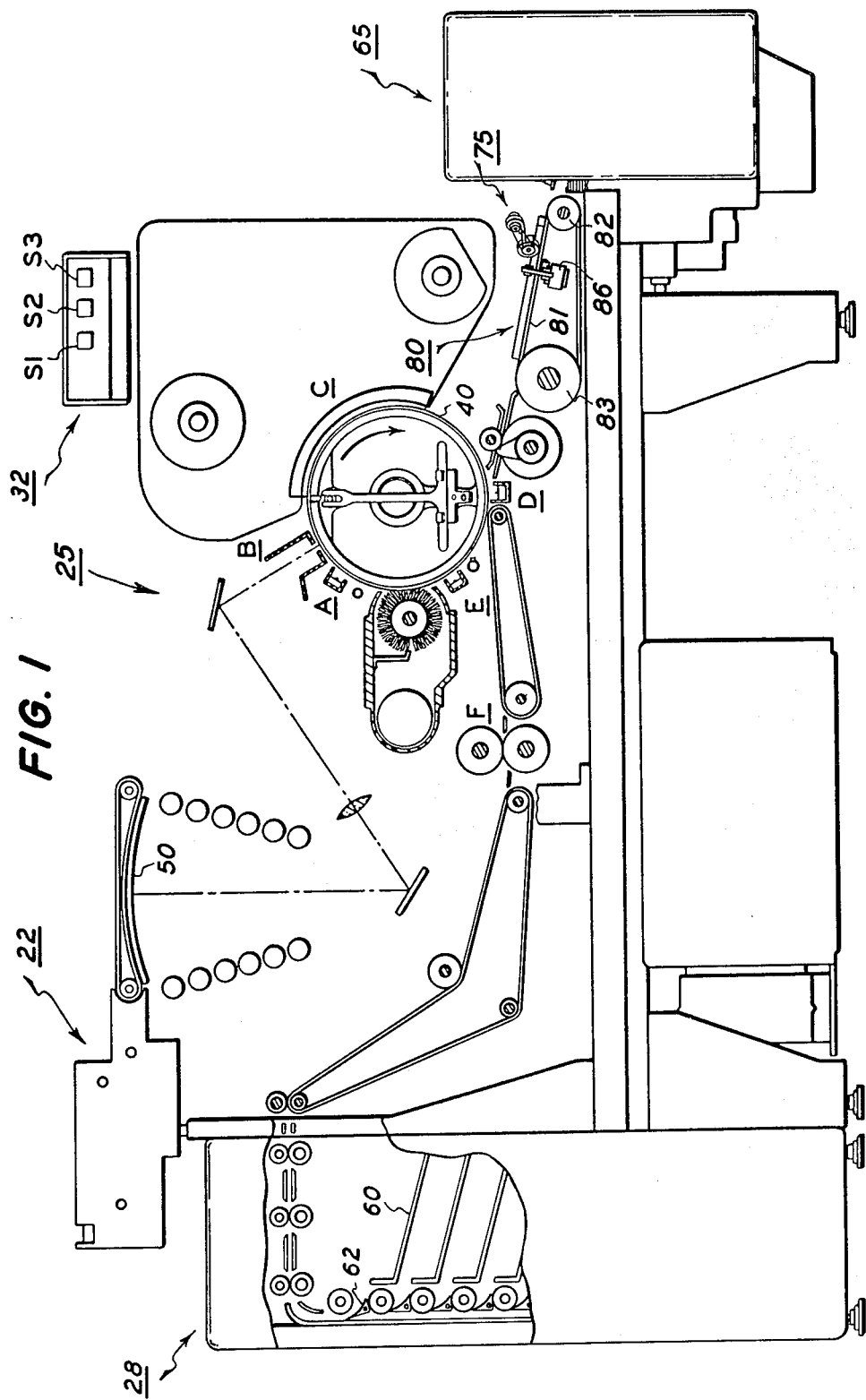
FIG. 1 illustrates schematically a xerographic reproduction system employing a sheet center line registration device in accordance with the instant invention.

As shown schematically in FIG. 1, the duplex xerographic reproducing system comprises a document feeding apparatus 22, positioned on a xerographic processor 25 which transports copy sheets to a sorting apparatus 28. A control panel 32 includes the usual counters and buttons as well as switch buttons S1 for START PRINT, S2 for sorter ON and S3 for document feeder ON. The processor includes a drum-shaped surface 40 including a photoconductive backing. This surface is mounted on a shaft journaled in a frame to rotate in the direction of the arrow to cause the drum surface sequentially to pass a plurality of xerographic processing stations.

For the purpose of the present disclosure, the several xerographic processing stations in the path of movement of the drum surface may be described functionally as follows:

A charging station A, at which a uniform electrostatic charge is deposited on the photoconductive layer of the xerographic drum;

An exposure station B, at which a light or radiation pattern of copies to be reproduced is projected onto the drum surface to dissipate the drum charge in the exposed areas thereof and thereby form a latent electrostatic image of the copy to be reproduced;

A developing station C, at which a xerographic developing material including toner particles having an electrostatic charge opposite to that of the electrostatic latent image are cascaded over the drum surface, whereby the toner particles adhere to the latent electrostatic image for a xerographic powdered image in the configuration of the copy being reproduced;

A transfer station D, at which the xerographic powder image is electrostatically transferred from the drum surface to a transport sheet material or drum surface;

A drum cleaning and discharge station E, at which the drum surface is brushed to remove residual toner particles remaining thereon after image transfer, and at which the drum surface is exposed to a relatively bright light source to effect substantially complete discharge of any residual electrostatic charge remaining thereon; and A fusing station F, at which the powder image is permanently affixed to the sheet material which is transported to sorting apparatus 28.

For a more detailed description of the copy processing stations reference is had to U.S. Pat. No. 3,301,126 to Osborne et al. which is commonly assigned.

In FIG. 1, a stack of documents are placed in a document feeding apparatus 22 in such a manner as to feed documents to the platen 50 of the processor. The operation of the document feeding apparatus is such that one document is fed to the platen to produce the desired number of copies and then advanced from the platen to enable the next document to be positioned in overlying relationship to the platen as described in the commonly assigned aforementioned patent. The sorter apparatus 28 comprises trays 60 each having a gate 62. In the first pass, the copy sheets are collected in the top tray only as will be described more fully hereinafter. After the first side of each document has been copied, the documents are reinserted in the document feeding apparatus and the second side copied. Prior to starting the system for the duplex pass, the copy sheets are returned to the copy sheet feeder section 65 and turned over for receiving copy print on the blank side. It will be appreciated that neither the documents or the copy sheets are rearranged or inversed to reshuffle the order of the sheets.

On the second or duplex pass, the copy sheets are distributed sequentially to the trays of the sorting apparatus to produce the desired number of collated and separated duplex sets in a minimum of time.

A detailed description of the control circuitry for this machine can be had from U.S. Pat. No. 3,841,754, issued Oct. 15, 1974 to Edward E. Drexler et al. which is incorporated herein by reference to the extent necessary to the understanding of this invention.

To produce duplex copies, the documents are restacked in the document feeding apparatus after each is copied the desired number of times. At the same time, the copy sheets are removed from tray 60 and placed in copy feeding section 65 of the processor with the second or backside turned for receiving the xerographic print. The start print button S1 is pressed initiating a normal operation for the sorting apparatus 28 with a motor (not shown) operating in the usual manner to index the gates 62. The motor remains energized and normal sorting of the copy sheets into the trays of the sorting apparatus occurs. By this structure, duplex copy sheets in book form are produced in collated separated bundles. It will be further appreciated that it is not necessary to rearrange or reshuffle the order to documents and/or copy sheets after the first pass or side one copies are produced and at the end of the duplex reproduction cycle.

Figure 2:
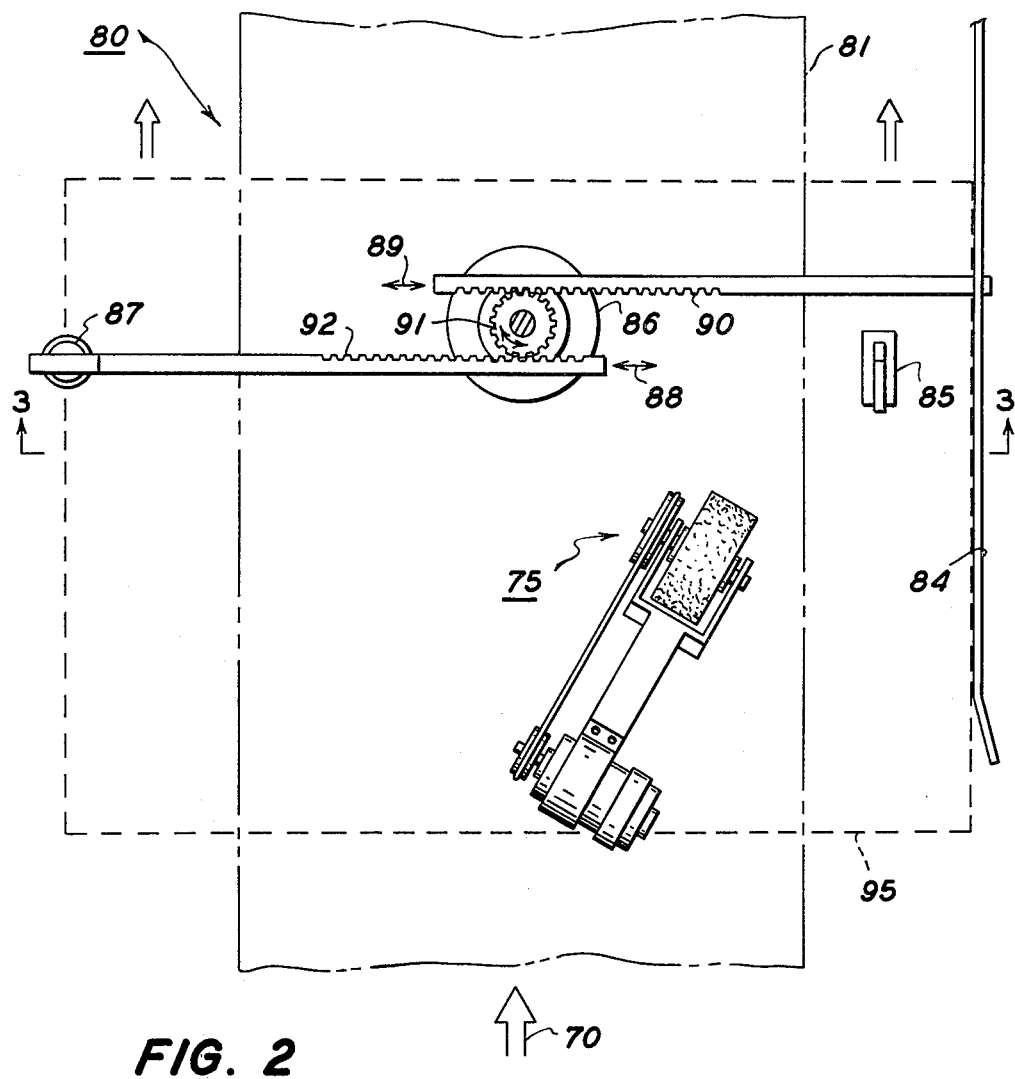
FIG. 2 is a plan view of the device of the present invention.
Figure 3:
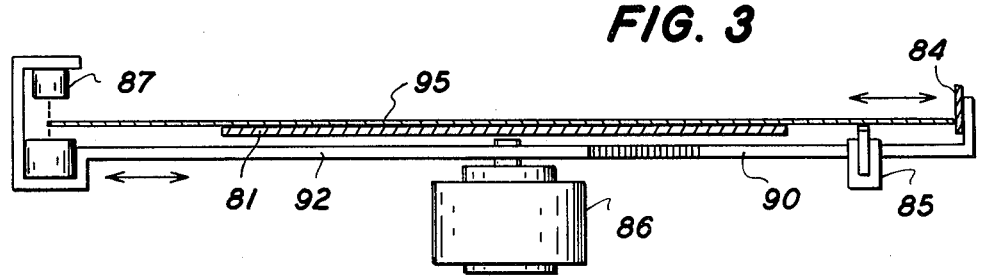
FIG. 3 is an end view of the present invention taken along line 3—3 of FIG. 2.

In an aspect of the present invention, FIGS. 1 and 2 show a device for precise center registration of a sheet or substrate with respect to a fixed center line or reference line in copier processor 25 indicated by arrow 70 in FIG. 2. If a sheet is registered against a fixed wall, the position of the sheet center line will vary because of tolerances of the sheet width. If the tolerances are $\pm \Delta w$, the variation in position of the sheet center line will be $\pm (\Delta w/2)$. This variation is eliminated by the present invention. Copy sheets, as they are fed from copy sheet feeder 65, pass onto center line registration means 80 which comprises a vacuum conveyor means that includes a belt 81 entrained over rollers 82 and 83. As a sheet 95 is driven from feeder 65, it is captured by conventional side scuffer means 75 which registers it against fixed wall or side guide 84. The sheet is driven forward in the direction of arrow 70 by conveyor belt 81 and into the path of switch 85 which actuates drive motor 86. Actuation of drive motor 86 causes sidewall 84 and photocell sensor 87 to move as shown by arrows 88 and 89. The motion of sidewall 84 and sensor 87 as shown in FIG. 3, is controlled by linkage 90, 91 and 92 so that the sidewall and the sensor are always equidistant from the machine center line. With the sheet registered against guide 84, the guide and sensor 87 move until the sensor senses the edge of the sheet. The motion is then stopped by a signal from the sensor, center line registration of the sheet having been obtained.

As an alternative, the entire assembly that holds the sheet can move sideways to achieve center line registration. The sheet edge can be detected by one sensor as described in reference to FIGS. 1 and 2. Also, both a coarse and precise registration can be achieved by moving the sidewall only, the entire assembly only, or the sidewall for one and the entire assembly for the other. For example, the sidewall can can be moved to achieve coarse registration, and the assembly moved to accomplish precise registration. The coarse registration could be done only when the nominal sheet size is changed.

In yet another aspect of the present invention, center line registration can be accomplished without the use of a sidewall. For example, the lead edge of a sheet could be driven against a gate. The sheet or assembly is then moved sideways. A sensor or two sensors equidistant from the machine center line, detect the side edge(s) of the sheet and stop the sheet movement.

In summary, a precise center line registration apparatus and method for substrates is disclosed comprising a sidewall and sensor that are adapted to move in unison relative to a machine center line. A sheet is fed against the sidewall while tripping a switch. The switch actuates a motor that drives the sidewall and sensor until the sensor senses the edge of the sheet. The motion is then stopped by a signal from the sensor.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention.

What is claimed is:

1. In a copier having a center line, a document feeding means for feeding documents for copying in seriation, copy processor means for copying each document and sorter means for receiving and sorting the copies, the improvement of precise copier center line registration means, comprising:

side guide means adapted to register copy sheets forwarded toward said processor;

sensor means located opposite said side guide means;

said side guide means and said switch means being symmetrically disposed on either side of the center line and being movable relative thereto at the same speed of movement, and switch means adapted to be actuated by the copy sheet passing along said side guide means, said switch means causing said side guide means and said sensor means to move in unison until said sensor means senses an edge of the copy sheet, and to terminate said moving when the center line registration is achieved.

2. A method of center registering a substrate along the center line of a copier that includes a processor comprising the steps of:

(a) providing movable side guide means along a path leading to said processor on one side of the center line and being movable relative thereto;

(b) providing a movable edge sensor opposite said said guide means on the other side of the center line and being movable relative thereto at the same speed of movement as that for the side guide means;

(c) providing switch means adjacent said guide means; and (d) providing substrate feed means for feeding a substrate along the path leading to said processor, said substrate actuating said switch means which in turn causes said side guide means and said sensor means to move relative to each other until said sensor senses the edge of said substrate thereby providing center registration of the substrate along the copier center line and to terminate said moving when the center line registration is achieved.

* * * * *